United States Patent
Li et al.

(10) Patent No.: US 11,847,063 B2
(45) Date of Patent: Dec. 19, 2023

(54) REINFORCING HIGH AVAILABILITY OF DISTRIBUTED RELATIONAL DATABASES

(71) Applicant: INTERNATIONAL BUSINESS MACHINES CORPORATION, Armonk, NY (US)

(72) Inventors: Shuo Li, Beijing (CN); Xiaobo Wang, Beijing (CN); Sheng Yan Sun, Beijing (CN); Hong Mei Zhang, Haidian District (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 9 days.

(21) Appl. No.: 17/572,841

(22) Filed: Jan. 11, 2022

(65) Prior Publication Data

US 2023/0222070 A1 Jul. 13, 2023

(51) Int. Cl.
| | |
|---|---|
| G06F 12/00 | (2006.01) |
| G06F 12/1009 | (2016.01) |
| G06F 15/173 | (2006.01) |
| G06F 12/0891 | (2016.01) |
| G06F 12/0882 | (2016.01) |

(52) U.S. Cl.
CPC ...... *G06F 12/1009* (2013.01); *G06F 12/0882* (2013.01); *G06F 12/0891* (2013.01); *G06F 15/17331* (2013.01)

(58) Field of Classification Search
CPC ............. G06F 12/1009; G06F 12/0882; G06F 12/0891; G06F 15/17331
See application file for complete search history.

(56) References Cited

U.S. PATENT DOCUMENTS

| | | | |
|---|---|---|---|
| 8,332,433 B2 | 12/2012 | Bentkofsky et al. | |
| 10,303,646 B2 | 5/2019 | Das et al. | |
| 11,003,652 B1 | 5/2021 | Li et al. | |
| 2005/0240585 A1* | 10/2005 | Makhervaks | ....... G06F 21/6218 |
| 2012/0095974 A1 | 4/2012 | Bentkofsky et al. | |
| 2015/0067085 A1* | 3/2015 | Guerin | .................... G06F 12/10 |
| | | | 709/212 |
| 2017/0277655 A1 | 9/2017 | Das et al. | |

(Continued)

FOREIGN PATENT DOCUMENTS

CN 111095225 A 5/2020

OTHER PUBLICATIONS

Cao, PolarDB Serverless: A Cloud Native Database for Disaggregated Data Centers (Year: 2021).*

(Continued)

*Primary Examiner* — Arvind Talukdar
(74) *Attorney, Agent, or Firm* — Stephanie Carusillo; Andrew D. Wright; Calderon Safran & Cole P.C.

(57) ABSTRACT

Systems and methods for high availability distributed data storage are provided. In embodiments, a method includes: receiving, by a remote direct memory access (RDMA) switch operatively coupled to a computing device, a request to access a page of a database; determining, by the RDMA switch, a validation state of the page; determining, by the RDMA switch, a status of the page; updating, by the RDMA switch, the status of the page based on the validation state and the request; and reporting, by the RDMA switch, the validation state.

20 Claims, 13 Drawing Sheets

(56) References Cited

U.S. PATENT DOCUMENTS

2019/0243552 A1    8/2019  Maharana et al.
2021/0089671 A1*   3/2021  Gkoulalas-Divanis ......................
                                                        G06F 21/6218

OTHER PUBLICATIONS

Mell et al., "The NIST Definition of Cloud Computing", NIST, Special Publication 800-145, Sep. 2011, 7 pages.

Erfan Zamanian et al., "Rethinking Database High Availability with RDMA Networks", https://doi.org/10.14778/3342263.3342639, Proceedings of the VLDB Endowment, vol. 12, Issue 11, Jul. 2019, 14 pages.

Karim Sonbol et al., "Review of RDMA-enabled Consensus Protocols," 2019 International Symposium on Networks, Computers and Communications (ISNCC), Jun. 18-20, 2019, 4 pages.

Unknown, "Using RDMA Accessible Memory as a Remote Paging Device", IP.com No. IPCOM000224387D, Dec. 17, 2012, 3 pages.

* cited by examiner

Downgrade "S" to "IS"

Downgrade "SIX" to "IX"

Downgrade "X" to "SIX"

Upgrade "IS" to "S"

Upgrade "IX" to "SIX"

Upgrade "IX" to "SIX" or "X"

Upgrade "SIX" to "X"

REINFORCING HIGH AVAILABILITY OF DISTRIBUTED RELATIONAL DATABASES

BACKGROUND

Aspects of the present invention relate generally to distributed database architecture and, more particularly, to a method and associated system for improving database technology associated with continuous availability and load balancing of the distributed databases by using a remote direct memory access (RDMA) switch to manage validity and dataset status to accelerate the page negotiation process.

SUMMARY

In a first aspect of the invention, there is a computer-implemented method including: receiving, by a remote direct memory access (RDMA) switch operatively coupled to a computing device, a request to access a page of a database; determining, by the RDMA switch, a validation state of the page; determining, by the RDMA switch, a status of the page; updating, by the RDMA switch, the status of the page based on the validation state and the request; and reporting, by the RDMA switch, the validation state.

In another aspect of the invention, there is a computer program product including one or more computer readable storage media having program instructions collectively stored on the one or more computer readable storage media. The program instructions are executable to: receive, by a remote direct memory access (RDMA) switch operatively coupled to a computing device, a request to access a page of a database; determine, by the RDMA switch, based on a bitmap that is a validation state of the page; record the request, by the RDMA switch, based on the access type and the validation state of the page; and report, by the RDMA switch, the validation state.

In another aspect of the invention, there is system including a processor, a computer readable memory, one or more computer readable storage media, and program instructions collectively stored on the one or more computer readable storage media. The program instructions are executable to: receive, by a remote direct memory access (RDMA) switch of the system, a request to access a dataset; determine, by the RDMA switch, a validation state of the dataset; determine, by the RDMA switch, a status of the dataset; update, by the RDMA switch, the status of the dataset based on the validation state and the request; identify, by the RDMA switch, a device of a distributed database that requested read access to the dataset; and report, by the RDMA switch, the validation state to the identified device.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
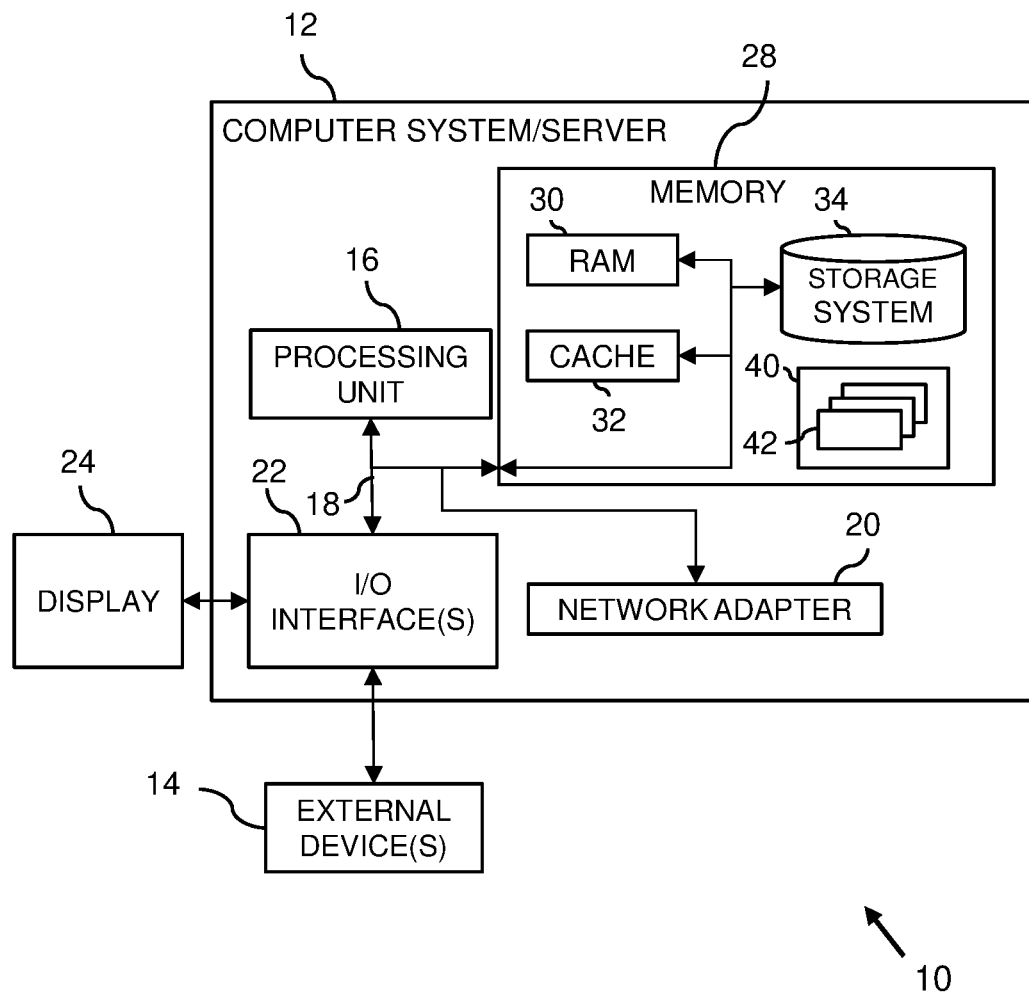
FIG. 1 depicts a cloud computing node according to an embodiment of the present invention.

Aspects of the present invention relate generally to distributed databases and, more particularly, to providing high accessibility procedures to distributed databases. In embodiments, an RDMA switch is utilized to facilitate in page consensus protocols for databases across RDMA network interfaces. In this manner, implementations of the invention provide lock status negotiation for pages in a database.

In embodiments, a data structure architecture includes a quick local buffer, a page index, a mapping between the quick local buffer and the page index, and an exchange page buffer. The quick local buffer includes a bitmap that is used for recording the validation status of the pages. The page index is used for recording the owners and users of pages. The mapping between quick local buffer and page index indicates connections between the quick local buffer and the page index. The exchange page buffer is used for the quick exchanging of pages between different systems.

In accordance with aspects of the invention, the page consensus protocol guarantees reading the correct data in the distributed database. In embodiments, when a system reads a page, the system registers that they have read the page in a page index list. The quick local buffer also includes an indicator that the page is valid. When there is a writer that makes changes on the page, the quick local buffer searches on the page index and sets invalidation on a bitmap for readers of the page who have registered on the page index. If there are any other systems which want to read the new version of the page, the systems request the page from the exchange page buffer.

In implementations, the dataset statuses for the database system are recorded by bitmap to identify the dependency. In embodiments, a bitmap is designed to record the page set statuses to identify whether there are other database systems that care about the page sets. In one example, the dataset status changes by a downgrade method when there are new write requests from other database system. In another example, the dataset status changes by an upgrade method when there are new read only requests from other database system.

The system architecture may be designed to include the quick buffer in a plurality of locations. The quick buffer could be duplicated for the high availability for the database system, located in the same system with databases or in separated servers.

Implementations of the invention utilize RDMA to dynamically update lock statuses of pages in a distributed database. In this way, embodiments of the invention enable a distributed database to utilize page consensus protocols that more efficiently coordinate page information than conventional techniques, while utilizing less computer processing resources (e.g., reduce page consensus cost) than methods that provide a share all or share nothing solution to page access. The present invention introduces the use of RDMA to manage page consensus protocols to unconventionally operate to generate new data techniques. The use of RDMA in managing page consensus protocols reduces resource costs (e.g., processing power, reduce latency), and more efficiently and effectively coordinates management of datasets for higher availability to access the dataset.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
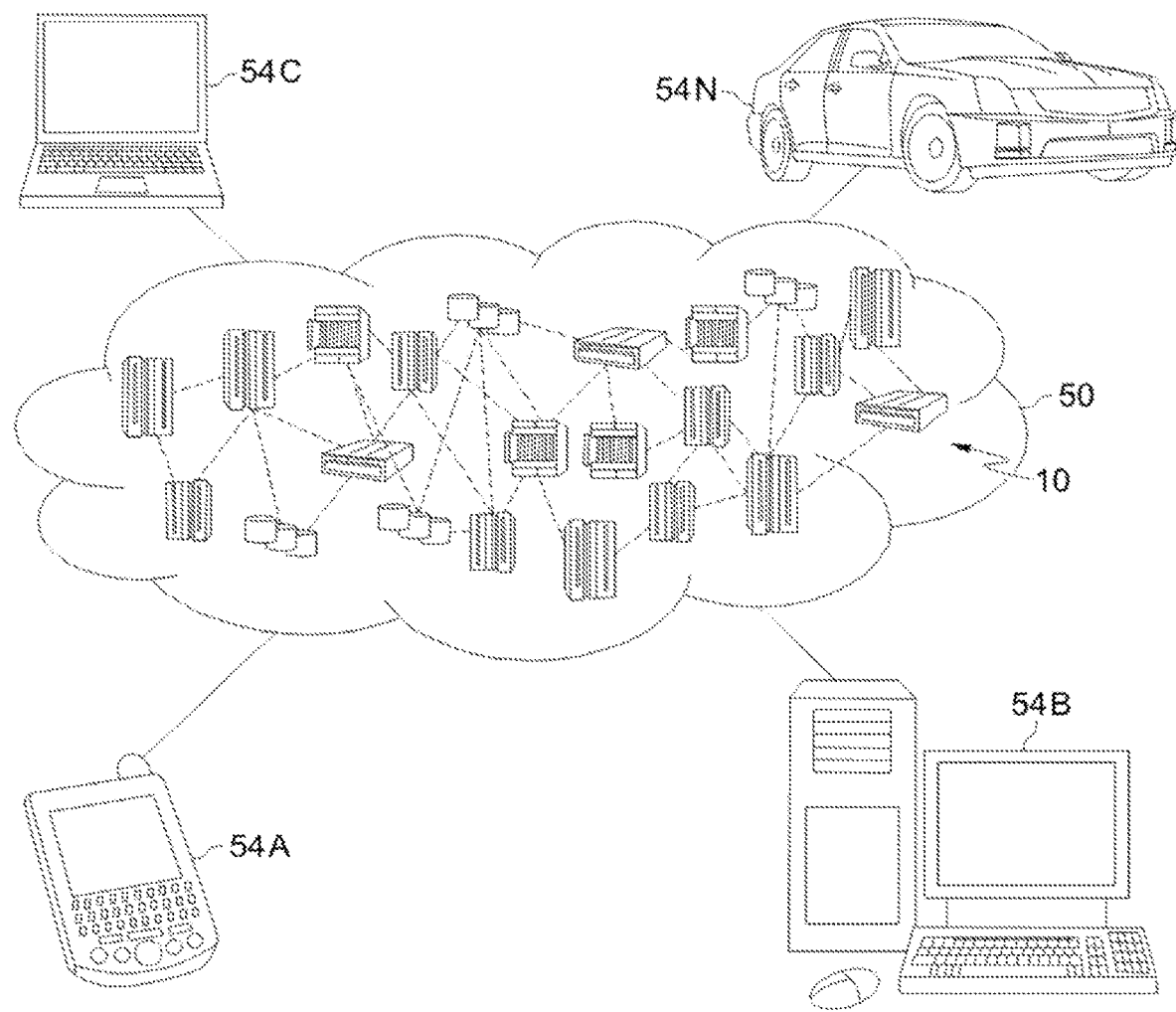
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
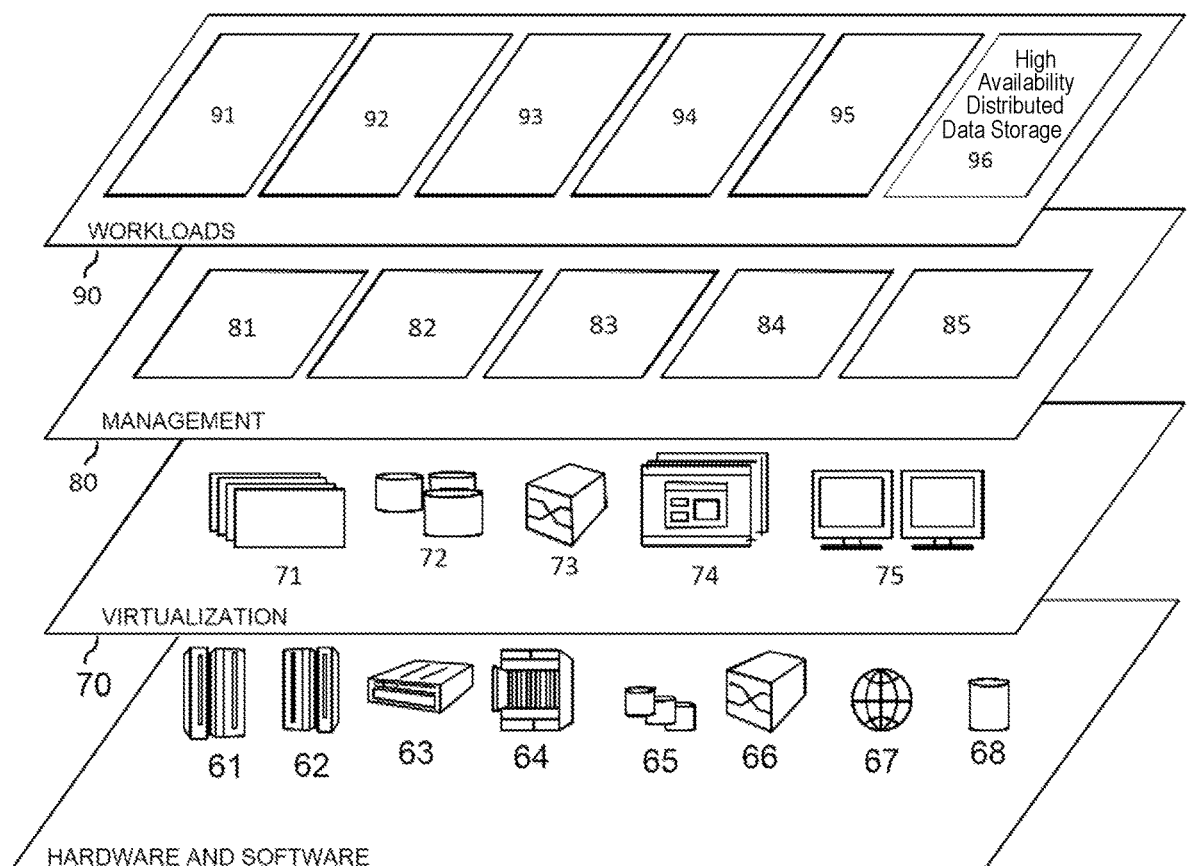
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and high availability distributed data storage 96.

Implementations of the invention may include a computer system/server 12 of FIG. 1 in which one or more of the program modules 42 are configured to perform (or cause the computer system/server 12 to perform) one of more functions of the high availability distributed data storage 96 of FIG. 3. For example, the one or more of the program modules 42 may be configured to: receive, by a remote direct memory access (RDMA) switch of the system, a request to access a dataset; determine, by the RDMA switch, a validation state of the dataset; determine, by the RDMA switch, a status of the dataset; update, by the RDMA switch, the status of the dataset based on the validation state and the request; identify, by the RDMA switch, a device of a distributed database that requested read access to the dataset; and report, by the RDMA switch, the validation state to the identified device.

Figure 4:
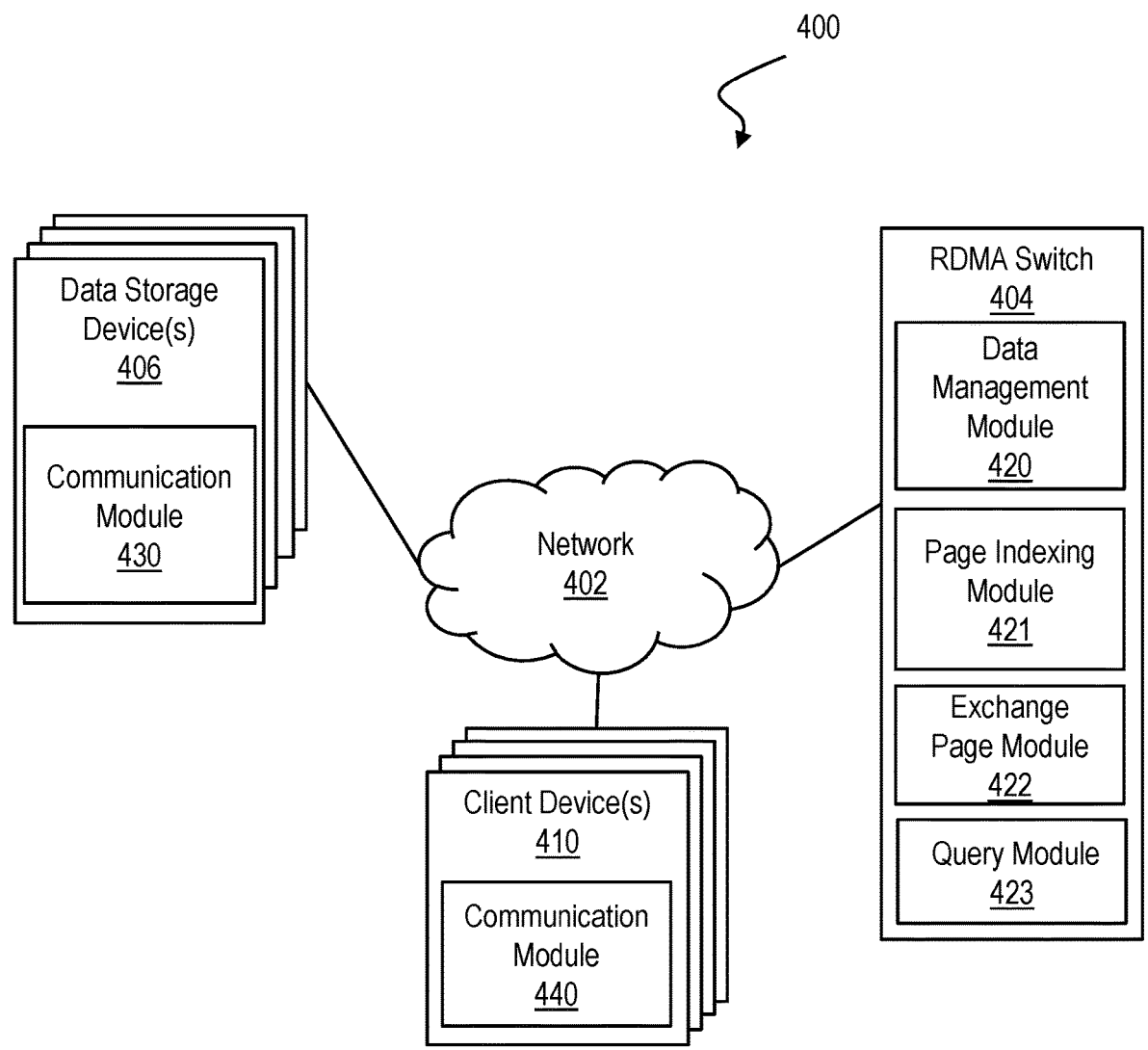
FIG. 4 shows a block diagram of an exemplary environment in accordance with aspects of the invention.

FIG. 4 shows a block diagram of an exemplary high availability distributed data storage environment 400 in accordance with aspects of the invention. In embodiments, the high availability distributed data storage environment 400 includes a network 402 enabling communication between an RDMA switch 404, data storage devices 406, and client devices 410.

The RDMA switch 404 may comprise the computer system/server 12 of FIG. 1, or elements thereof. The RDMA switch 404 may be a computing node 10 in the cloud computing environment 50 of FIG. 2. In embodiments, the RDMA switch 404 comprises one or more modules, each of which may comprise one or more program modules such as program modules 42 described with respect to FIG. 1.

In the example of FIG. 4, the RDMA switch 404 includes a data management module 420, a page indexing module 421, an exchange page module 422, and a query module 423. In implementations, the data management module 420 (comprising one or more program module(s) 42 of FIG. 1, for example) is configured to obtain or access a distributed relational database including multiple data tables. In implementations, each table is a two-dimensional arrangement of data including horizontal rows and vertical columns, wherein each column has a name and contains a particular data type. In embodiments, Structured Query Language (SQL) is the database language utilized to access tables of a relational database.

In implementations, the page indexing module 421 (comprising one or more program module(s) 42 of FIG. 1, for example) is configured to provide page indexing for data in the distributed relational database. In embodiments, the page exchange module 422 (comprising one or more program module(s) 42 of FIG. 1, for example) is configured to provide members of the distributed relational database with a most recent page copy of requested pages.

In embodiments, the query module 423 (comprising one or more program module(s) 42 of FIG. 1, for example) is configured to receive queries from users, forward queries to public and private cloud environments, obtain results from both the public and private cloud environments, and return query results to the user based on the results from both the public and private cloud environments.

In embodiments, the RMDA switch 404 may have a memory limit so only copies of changed pages are placed in the exchange page buffer. There also may be threshold number of changed pages stored in the exchange page buffer, thus the RDMA switch 404 may track the number in the exchange page buffer and release older changed pages or less viewed changed pages to release some memory for further use.

The data storage devices 406 may comprise computing devices (e.g., the computer system/server 12 of FIG. 1, or elements thereof) in a networked environment. In implementations, the data storage devices 406 comprise personal computing devices (e.g., 54A, 54B, 54C, etc.) in the cloud computing environment 50 of FIG. 2. The data storage devices 406 may comprise one or more program modules such as program modules 42 described with respect to FIG. 1. In implementations, the data storage devices 406 include a communication module 430 (e.g., including one or more program modules 42 described with respect to FIG. 1) enabling a data storage device 406 or client device 410 to send database queries, via the communications modules 430 and 440 respectively, to the RDMA switch 404 and receive query results from the RDMA switch 404. In accordance with aspects of the invention described below, the data storage device 406 may store and manage access to datasets including tables and pages. These datasets may refer to a page, pageset or table particularly, however, all these terms "datasets", "pagesets", "pages", and "tables" may be used interchangeably.

In implementations, the communication module 430 is a host channel adapter capable of communicating with the RDMA switch 404 (discussed in more detail below). In implementations, the communication module 430 is a RDMA network interface of the data storage devices 406 capable of providing communications between RDMA local buffers of the data storage devices 406. In embodiments, the RDMA network interface is a host channel adapter (HCA).

The client devices 410 may comprise computing devices (e.g., the computer system/server 12 of FIG. 1, or elements thereof) in a networked environment. In implementations, the client devices 410 comprise personal computing devices (e.g., 54A, 54B, 54C, etc.) in the cloud computing environment 50 of FIG. 2. The client devices 410 may comprise one or more program modules such as program modules 42 described with respect to FIG. 1. In implementations, the client devices 410 include a communication module 440 (e.g., including program modules 42 described with respect to FIG. 1) enabling a user to send database queries to the data storage devices 406 or the RDMA switch 404 and receive query results.

The RDMA switch 404, data storage devices 406 and client devices 410 (i.e., members of a distributed database) may each include additional or fewer modules than those shown in FIG. 4. In embodiments, for each of the RDMA switch 404, data storage devices 406 and client devices 410, separate modules may be integrated into a single module. Additionally, or alternatively, a single module may be implemented as multiple modules. Moreover, the quantity of devices and/or networks in the distributed data storage environment 400 is not limited to what is shown in FIG. 4. In practice, the distributed data storage environment 400 may include additional devices and/or networks; fewer devices and/or networks; different devices and/or networks; or differently arranged devices and/or networks than illustrated in FIG. 4.

Figure 5:
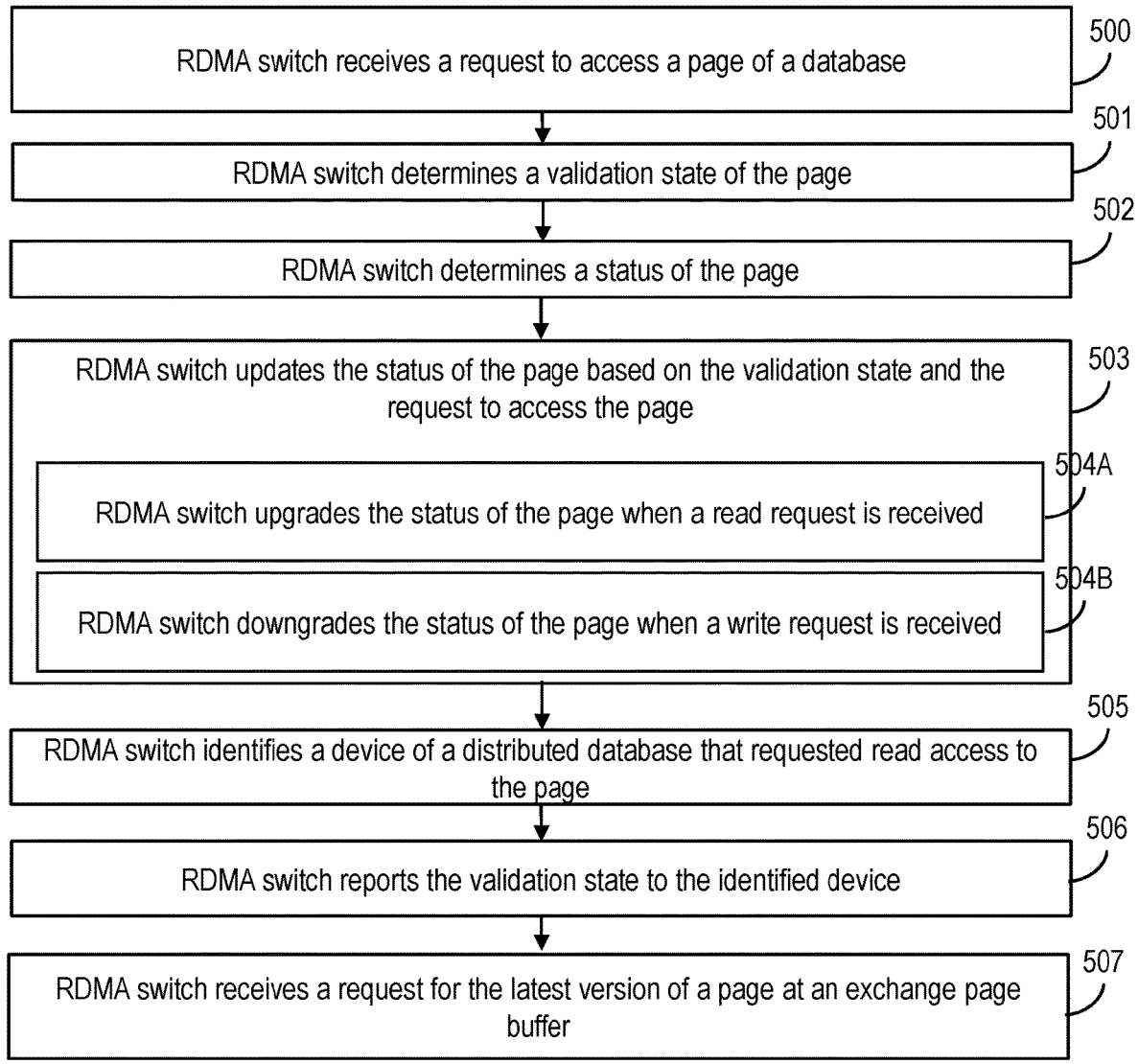
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 500, the RDMA switch 404 receives a request to access a page of a database. In aspects of the invention, the request includes requests for one of two types of access including read and write access to the page. In embodiments, the requests may be made from one or more client devices 410 or one or more data storage devices 406 of the distributed database of FIG. 4.

At step 501, the RDMA switch 404 determines a validation state of the page. In embodiments, the validation state of the page is placed in a bitmap (i.e., the validation bitmap) to show the page is valid or invalid. In embodiments, the validation bitmap keeps track of the validity of each page accessed by the local data storage device 406. For example, a member device of the distribution database makes a change to a page. The new page is copied to the exchange page buffer of the RDMA switch 404 for redistribution to requesting devices and marked as invalid on the local validation bitmap of the requesting devices.

At step 502, the RDMA switch 404 determines a status of the page. In embodiments, the status of the page is a lock status for each page in the distributed database. The lock status provides a way to track whether one or more members are changing a page or table in the distributed database and prevent access to the changing page. Because of the coordination and storage of this information, page consensus can more efficiently be met. In embodiments, the lock status is in a bitmap (i.e., status bitmap) for each page.

Examples of lock status of a page are shown in the table below.

TABLE 1

Different types of dataset statuses.

| Type | # | Class | State Description |
| --- | --- | --- | --- |
| IS | 1 | Read | Share with another writer |
| IX | 2 | Write | Exclusive with another writer |
| S | 3 | Read | Share without another writer |
| SIX | 4 | Write | Exclusive writer with other readers |
| NSU | 5 | Write | Intermediate status for protection |
| X | 6 | Write | Exclusive without reader and writer |

Table 1 includes descriptions of dataset statuses. For example, the read "IS" type dataset status indicates a shared read with at least one other writer, thus any changes to the dataset by the writer would ideally be reported to the reader. The write "IX" type dataset status indicates access to the dataset by two exclusive writers, thus any changes to the dataset should update to both writers, and while making changes, only one writer should have access to the dataset. The read "S" type dataset status indicates a shared read dataset with no writers, so no changes need to be tracked. The write "SIX" type dataset status indicates an exclusive writer with one or more readers, thus any changes by the exclusive writer should be reported to the readers for the latest version of the dataset. The write "NSU" type dataset status indicates intermediate status for protection. The write "X" type dataset status indicates an exclusive writer with no other members accessing the dataset, thus no reporting is necessary.

At step 503, the RDMA switch 404 updates the status of the page based on the validation state and the request to access the page. For example, at step 504A, the RDMA switch 404 upgrades the status of the page when a read request is received; and at step 504B, the RDMA switch 404 downgrades the status of the page when a write request is received. Examples of lock status changes of a page are shown in the table below.

TABLE 2

Summary of status changes for a dataset.

| Previously Held Status | Previous Cache Status | Request | New Cache Status | Downgrade/Upgrade | Newly Held Status |
| --- | --- | --- | --- | --- | --- |
| S | S | SIX | IS | Downgrade | IS |
| IS | IS | 0 | S | IS -> S Upgrade | S |
| IS | S | 0 | IS | Nothing to Do | IS |
| IS | S | 0 | IS | Nothing to Do | IS |
| X | X | IS | SIX | X -> SIX Downgrade | SIX |
| NSU | X | IS | SIX | X -> SIX Downgrade | SIX |
| SIX | SIX | 0 | X | Choose not to do SIX -> X | SIX |
| SIX | SIX | IX | IX | SIX -> IX Downgrade | IX |
| SIX | X | 0 | SIX | Nothing to Do | SIX |
| IX | IX | 0 | X | IX -> SIX Upgrade | SIX |
| IX | IX | 0 | SIX | IX -> SIX Upgrade | SIX |
| IX | SIX | 0 | X | IX -> SIX Upgrade | SIX |
| IX | SIX | 0 | IX | SIX -> IX Downgrade | IX |
| IX | X | 0 | SIX | IX -> SIX Upgrade | SIX |

Table 2 shows a summary of different status changes for a dataset based on the action requested and statuses of the dataset and requester. For example, in the first line, the previously held status of the dataset is a read "S" type and the previously cached status for the requesting member is a read "S" type. However, the request is to become an exclusive writer to the dataset of write "SIX" type. The newly held status and cached status of the dataset is a downgraded read "IS" type.

At step 505, the RDMA switch 404 identifies any device (excluding the requesting client device 410 or data storage device 406) of a distributed database that requested read access to the page. At step 506, the RDMA switch 404 reports the validation state to the identified device. At step 507, the RDMA switch 404 receives a request for the latest version of a page at an exchange page buffer. The readers of the page are tracked to notify of any changes to the page. In embodiments, the identified devices may be any of the requesting devices of the distributed database. Based on this identification, a notification of changes to the page may be communicated to the reader. To remedy the issue of having an outdated page, the readers of the page may request and more efficiently receive the newest version of the page from the RDMA switch 404.

Figure 6:
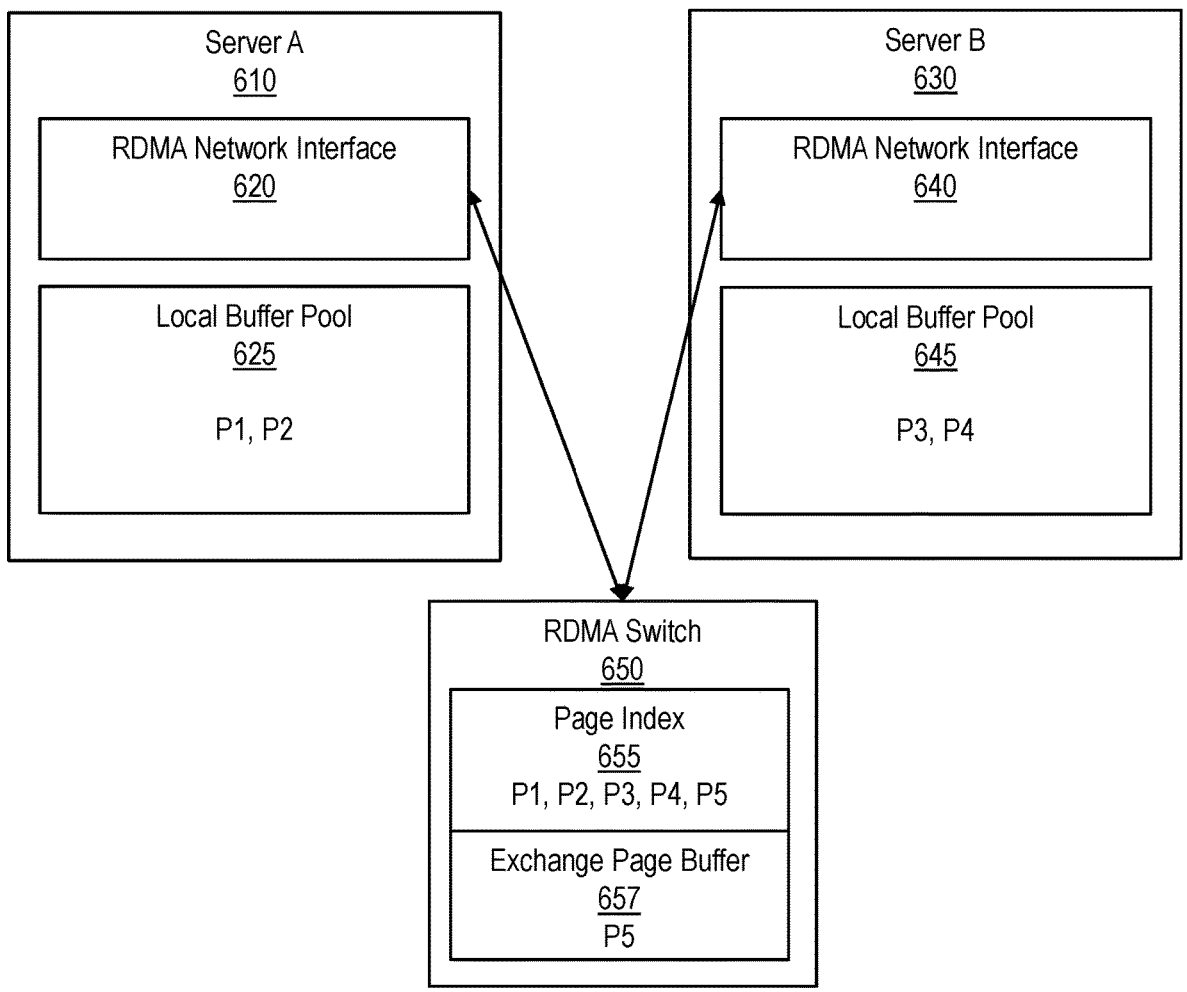
FIG. 6 shows a block diagram of an exemplary system architecture in accordance with aspects of the invention.

FIG. 6 shows a block diagram of an exemplary system architecture in accordance with aspects of the invention. The system in FIG. 6 includes elements that are described with reference to elements depicted in FIG. 4. In embodiments, Server A 610 and Server B 630 each may be one of a data storage device 406 or client device 410 of FIG. 4. The Server A 610 or Server B 630 may be a requesting member of the distributed database. To reduce latency of the request negotiation among Server A 610 and Server B 630, RDMA is utilized. In embodiments, each Server A 610 and Server B 630 also includes a local buffer pool 625 and 645, respectively. The RDMA network interface 620 of server A 610 communicates with the RDMA network interface 640 of Server B 630. These RDMA network interfaces 620 may be the communications modules 430 of FIG. 4 and are commonly HCAs. This communication is facilitated by an RDMA switch 650 that includes a page index 655 for pages in the distributed database and an exchange page buffer 657 to temporally store any changed pages for quicker access. The RDMA switch 650 may be the RDMA switch 404; page index 655 may be the page indexing module 421; and the exchange page buffer 657 may be the exchange page module 422 of FIG. 4. The local buffer pools 625 and 645 maintain a validation bitmap and/or status bitmap for the pages stored in each respective member (i.e., server A 610 and server B 630). Each member and RDMA switch 650 of the distributed database includes their own page index to help find page locations and members that are accessing the page.

Figure 7:
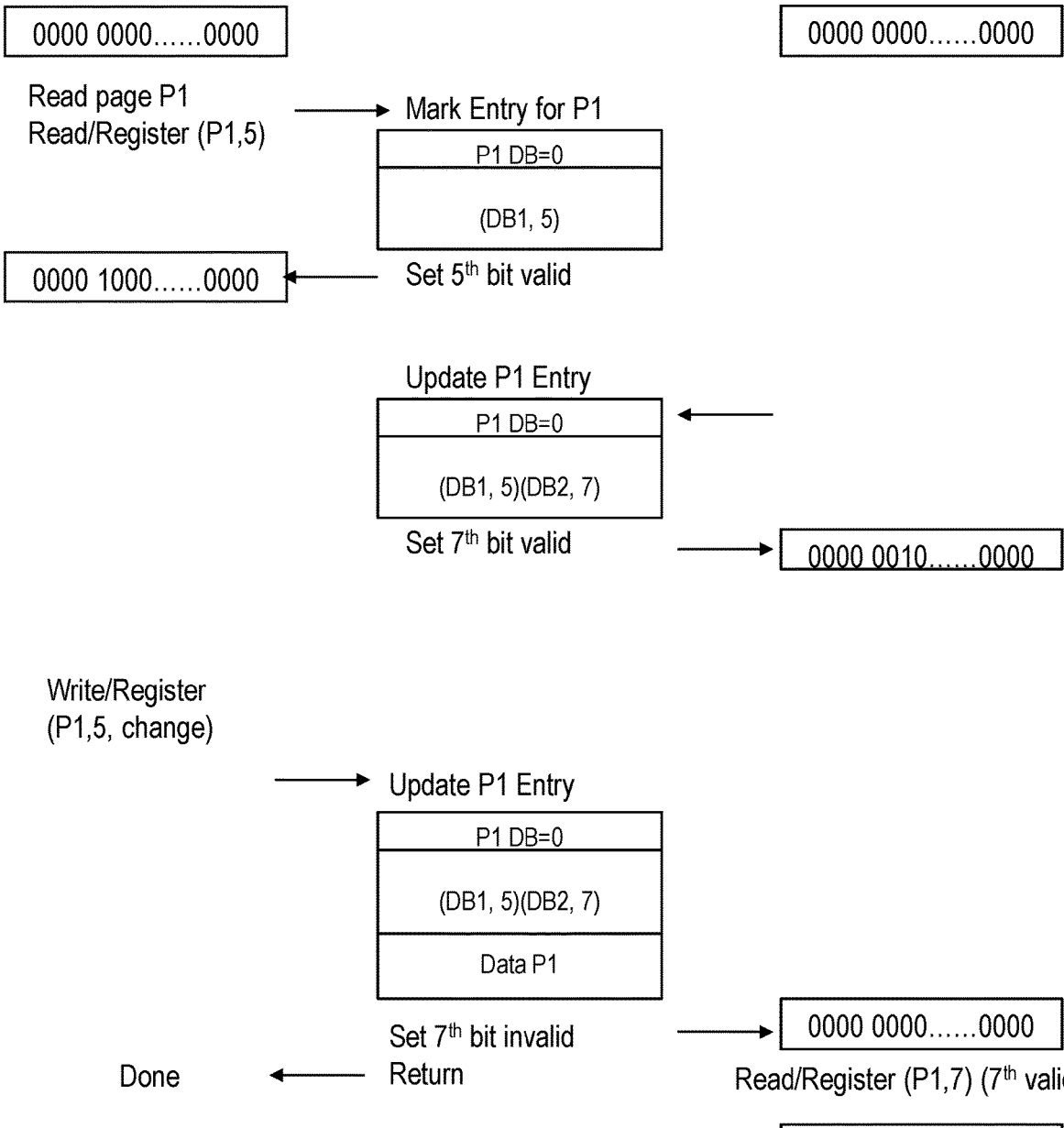
FIG. 7 shows a flow diagram of communication between the exemplary system architecture of FIG. 6 in accordance with aspects of the invention.

FIG. 7 shows a flow diagram of communication between the exemplary system architecture of FIG. 6 in accordance with aspects of the invention. FIG. 7 also includes steps that are described with reference to the steps in the flowchart of FIG. 5. The buffer 750 of the RDMA switch 650 facilitates page validation through communication between the RDMA local buffer 710 of Server A 610 and RDMA local buffer 730 of Server B 630. As shown, the RDMA local buffer 710 holds a bitmap (the validation bitmap and/or status bitmap) for page P1. Server A 610 wants to read page P1, thus Server A sends a request, as seen in step 500 of FIG. 5, to RDMA switch 650 to mark page P1 as read and valid. Server B 630 also sends the RDMA switch 650 a request or query that validates bit 7 of database 2 DB2 of Server B 630 and updates the P1 entry to include Server B 630 as a read member interested in the page P1.

In embodiments, Server A 610 requests a write of page P1. The writing updates the P1 entry and sets the read member bits to invalid. This invalidity is then updated in Server B 630 bit 7 for future requests to read page P1. When Server B 630 requests to read page P1 again, the Server B 630, as described in step 507 of FIG. 5, will request the latest version of page P1 from the RDMA switch 650 exchange page buffer (for quick access).

FIGS. 8A-8C and 9A-9D show a flow chart of a request, a request type, and updating the status of the page and the change in status to the requesting party in accordance with aspects of the invention. Aspects of the present invention are described herein with reference to a flow of communications and status changes between two Databases A and B, of Servers A 610 and B 630 respectively, as shown in FIG. 6. The page statuses described are further defined in Table 1 of step 502 of FIG. 5. Other exemplary status changes are also detailed in Table 2 of step 503 of FIG. 5. In aspects of the present invention, the status types are described in Table 1 above.

Figure 8A:
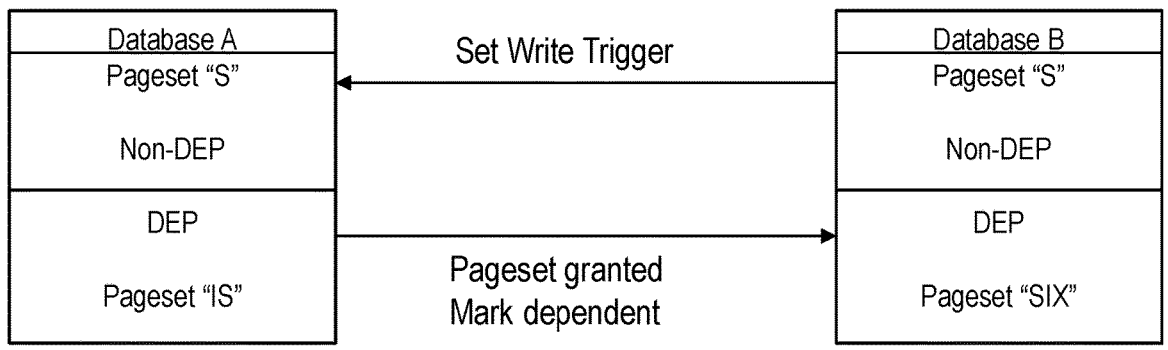
FIGS. 8A-8C show flow charts of exemplary read requests to the page that indicate an upgrade in the status of the page in accordance with aspects of the invention.
Figure 8B:
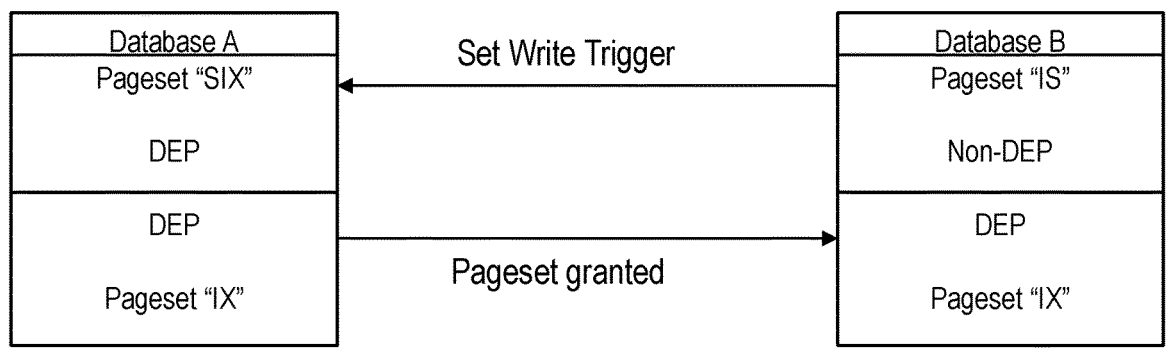
Figure 8C:
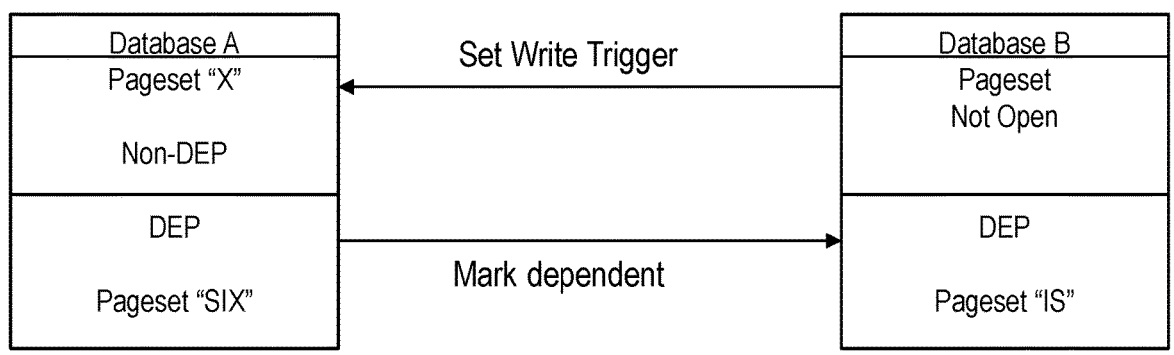

FIGS. 8A-8C show flow charts of exemplary write requests to the page that indicate a downgrade in the status of the page. The statuses described in these flow charts are indicated by the status bitmap held locally in Database A of Server A 610 and Database B of Server B 630 in local buffer pools 625 and 645 respectively, as shown in FIG. 6. In FIG. 8A, Database B requests a write to a page in Database A. The page status is changed from "S" to "IS". Database B changes from a reader "S" type to writer "SIX" type, i.e., the shared read changes from members only reading the page to one member writing and the others reading. The access to the pageset is granted and marked as dependent to the Database B writer.

In FIG. 8B, Database B requests a write to a page in Database A. The page status is changed from "SIX" to "IX". Database B changes from a reader "IS" type to writer "IX" type, i.e., initially only one writer exists to the page and now a second writer added. The access pageset is granted dependent to the Database B writer.

In FIG. 8C, Database B requests a write to a page in Database A. The page status is changed from "X" to "SIX". Database B changes from an unopened pageset to reader "IS" type, i.e., only a single writer previously existed and now a reader is added. The pageset is marked as dependent to the Database B exclusive reader.

Figure 9A:
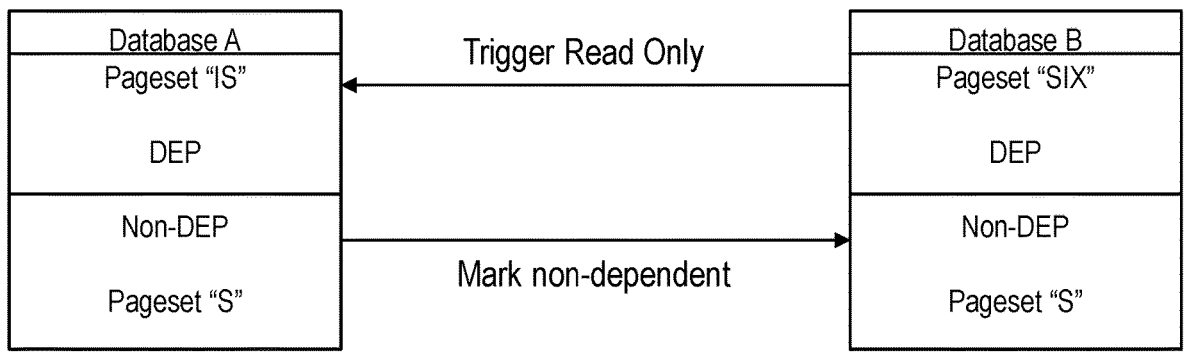
FIGS. 9A-9D show flow charts of exemplary write requests to the page that indicate a downgrade in the status of the page in accordance with aspects of the invention.

FIGS. 9A-9D show flow charts of exemplary write requests to the page that indicate a downgrade in the status of the page in accordance with aspects of the invention. The statuses described in these flow charts are indicated by the status bitmap held locally in Database A of Server A 610 and Database B of Server B 630 as shown in FIG. 6. In FIG. 9A, Database B requests a read to a page in Database A. The page status is changed from "IS" to "S". Database B changes from a writer "SIX" type to reader "S" type, i.e., the sole writer is changed to a reader and thus only readers of the page exist. The pageset is marked as non-dependent to the Database B reader.

Figure 9B:
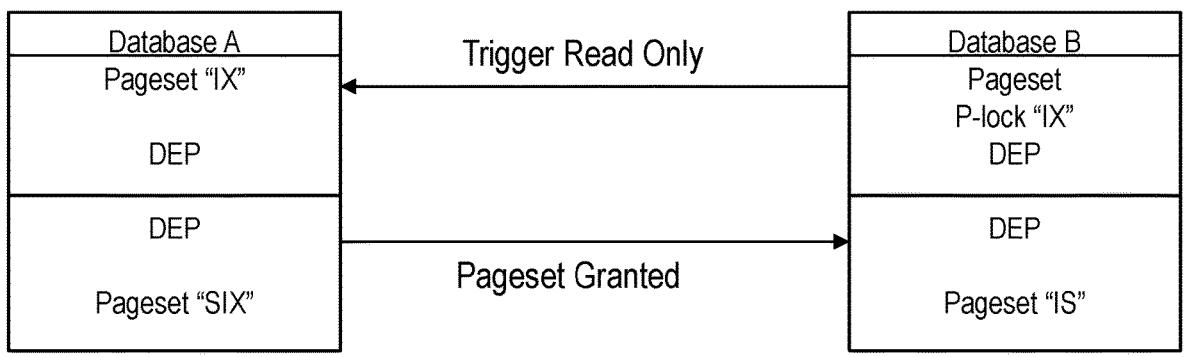

In FIG. 9B, Database B requests a read to a page in Database A. The page status is changed from "IX" to "SIX". Database B changes from pageset locked writer "IX" type to reader "IS" type, i.e., one of the two exclusive writers has become a reader. The access to the pageset is granted and marked as dependent to the Database B exclusive reader.

Figure 9C:
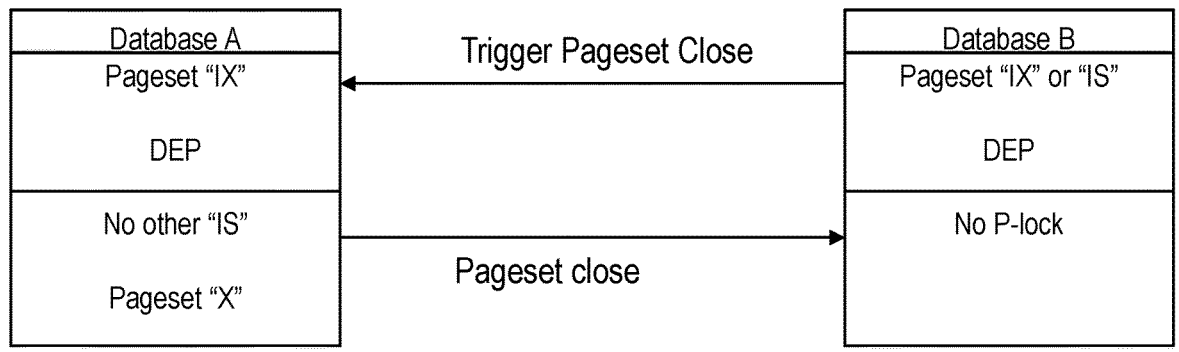

In FIG. 9C, Database B requests to close the pageset to a page in Database A. The page status is changed from "IX" to "SIX" or "X". Database B changes from a writer "IX" or reader "IS" type to not having a pageset type, i.e., two exclusive writers to one writer or one exclusive writer to no readers or writers. The pageset is closed.

Figure 9D:
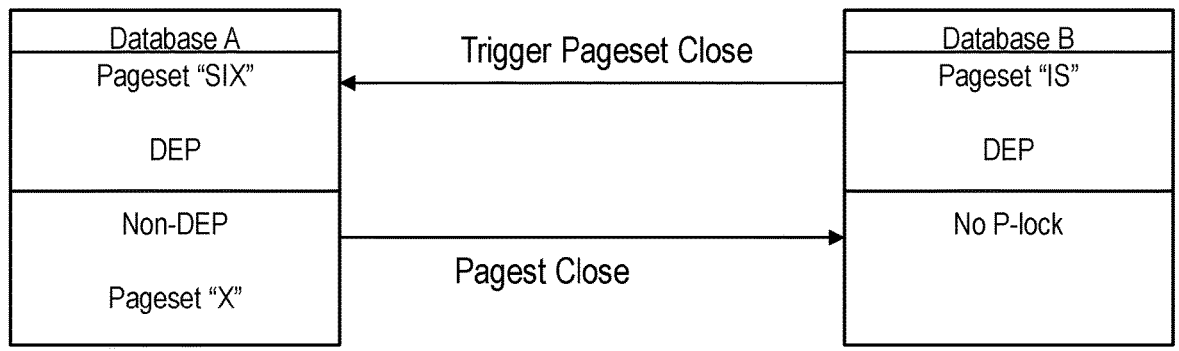

In FIG. 9D, Database B requests to close the pageset to a page in Database A. The page status is changed from "SIX" to a non-dependent "X". Database B changes from reader "IS" type to not having a pageset type, i.e., exclusive writer with a single reader to exclusive writer without any readers. The pageset is closed.

Figure 10A:
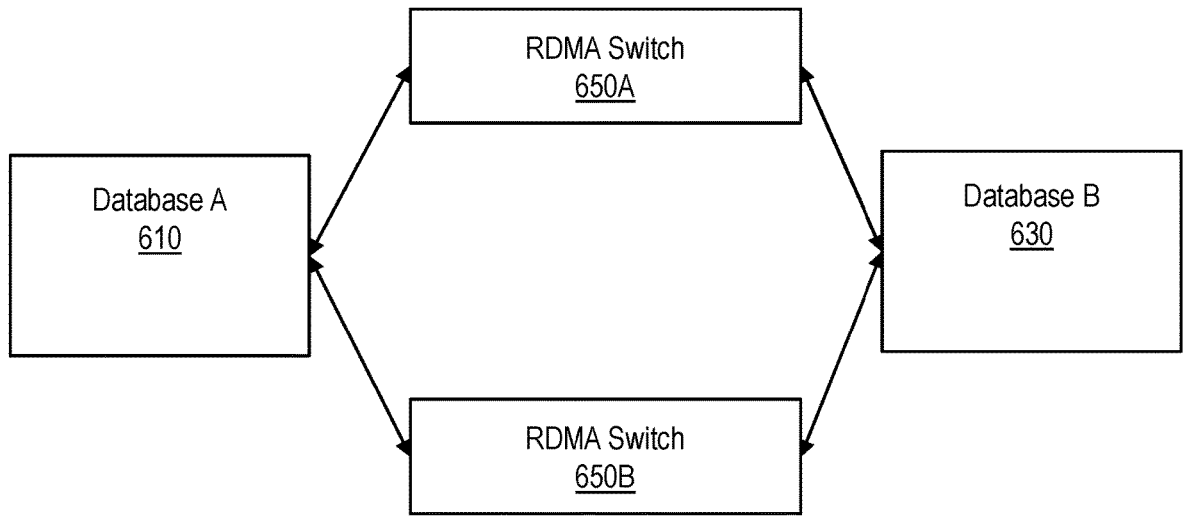
FIGS. 10A-10D show aspects of the present invention with various system architectural designs for RDMA switch placement for backup in accordance with aspects of the invention.
Figure 10B:
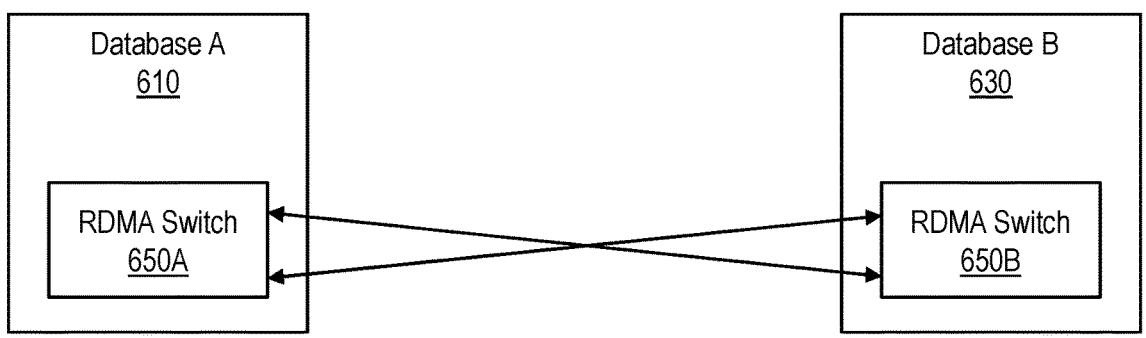
Figure 10C:
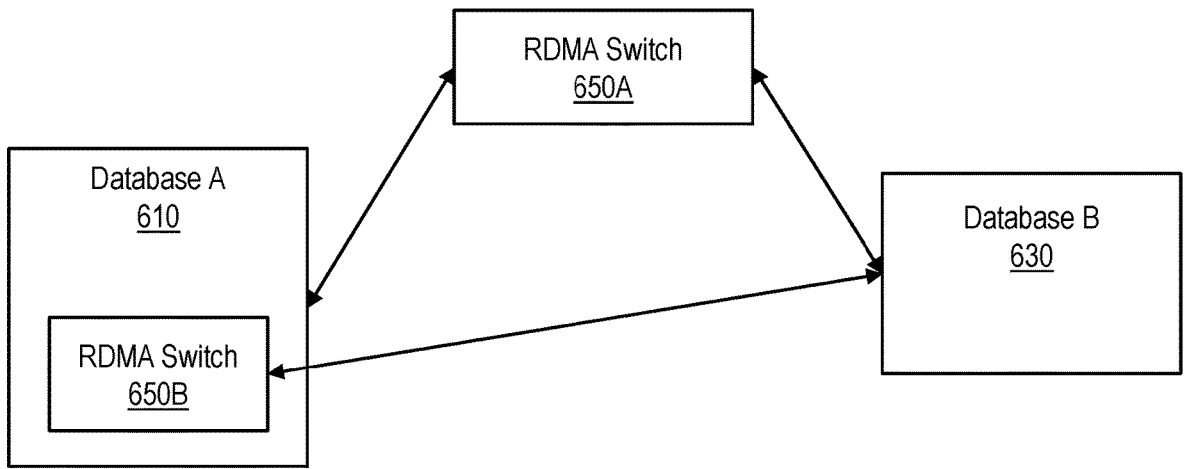
Figure 10D:
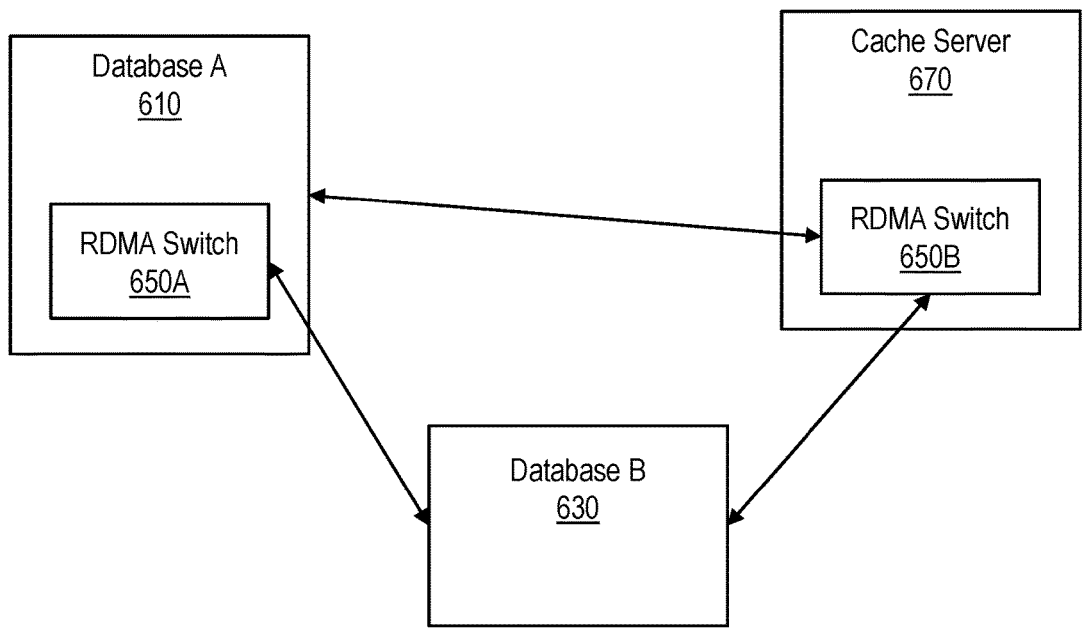

FIGS. 10A-10D show aspects of the present invention with various system architectural designs for RDMA switch placement for backup in accordance with aspects of the invention. Each system includes two RDMA switches, where one of the RDMA switches is utilized as a backup incase the other crashes or otherwise malfunctions. In FIG. 10A, the RDMA switches 650A and 650B are standalone hardware from the Databases A 610 and B 630. In FIG. 10B, the RDMA switches 650A and 650B are integrated into Databases A 610 and B 630, respectively. In FIG. 10C, one RDMA switch 650A is standalone hardware and the other RDMA switch 650B is integrated into Database A 610. In FIG. 10D, one RDMA switch 650A is integrated into Database A 610 and the other is integrated into a cache server 670.

The foregoing description is just an example of embodiments of the invention, and variations and substitutions of the placed RDMA switches and the quantity of RDMA switches is not limited to what is shown in each of FIGS. 10A-10D. In practice, the system may include additional RDMA switches and servers; fewer RDMA switches and servers; other unrelated devices (e.g., client or network devices); or differently arranged RDMA switches and servers than illustrated in FIGS. 10A-10D. For example, in embodiments, three or more RDMA switches may be used and integrated into a database, integrated into a cache server, and as standalone hardware.

In system architectures where not all members of the distributed database are sharing devices, the cloud database architecture supported by the Parallel Sysplex is an adaptation which uses coupling facilities to solve the problem posed by messaging for concurrency and coherency control. High speed access to the coupling facilities provides the necessary controls while minimizing messaging traffic. The cloud database architecture is at least as robust as the cloud database architecture alternative for continuous availability and load balancing. Because of the coupling efficiencies and the ability to add capacity with low granularity, the cloud database architecture offers greater flexibility for growth with excellent scalability.

Currently, the common structure for the cloud database is one writer with multi-readers. High performance multi-write in a cloud database is difficult to do. Thus, a method to apply high performance multi-write in a cloud database is made possible by the present invention.

The high-performance multi-write method will include: Selection of a leader cluster including a selection one of the clusters as the leader of the cloud database. Log replication by the clusters including replication of a log listing to follower clusters of the leader cluster. Network deviation handling including the cloud database being capable of handling any potential network or system failures.

A detailed design of the column level lock of the high-performance multi-write method will include: First, selection of a leader cluster. All the write clusters have asymmetric vote weighting. Because each write cluster has different weights for the leader selection vote, at each period, the clusters will have to prepare signals to indicate the weight of their vote in selection of the leader cluster. If any node receives more than half of the total weight of all the votes, the cluster is selected as the leader.

Second, log replication by the clusters. For each cluster, one of the nodes is selected as a copy node. The copy node takes charge of copying the log from the leader cluster and then sends the copied log to other nodes.

Third, network deviation handling. Problems may occur in the write cluster and between different nodes, solutions to these issues should be handled by the cloud database. Many methods may be used to handle different situations that may include network deviations, write errors, and coupling facility errors.

With this new high performance multi-write method, the multi-write in a cloud database can be improved.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by a remote direct memory access (RDMA) switch operatively coupled to a computing device, a request to access a page of a database;
determining, by the RDMA switch, a validation state of the page;
determining, by the RDMA switch, a status of the page;
updating, by the RDMA switch, the status of the page based on the validation state and the request; and
reporting, by the RDMA switch, the validation state,
wherein the status of the page comprises a lock status which provides a tracking of whether at least one member changes the page in the database, and
the lock status comprises at least three dataset statuses which include a class and a state description for the page.

2. The computer-implemented method of claim 1, wherein the RDMA switch is duplicated in a server of a distributed database.

3. The computer-implemented method of claim 1, wherein the computing device is part of a distributed database.

4. The computer-implemented method of claim 1, further comprising:
reporting that the request is made to an exchange page buffer, wherein the request to access is to read the page.

5. The computer-implemented method of claim 1, wherein the validation state is in a bitmap that is mapped to a page index that records owners and users of pages in a distributed database associated with the RDMA switch.

6. The computer-implemented method of claim 1, wherein the updating includes upgrading or downgrading the status of the page.

7. The computer-implemented method of claim 6, wherein the request to access the page is a write request and the status of the page is downgraded.

8. The computer-implemented method of claim 6, wherein the request to access the page is a read request and the status of the page is upgraded.

9. The computer-implemented method of claim 1, further comprising: in response to the validation state being invalid, receiving a request for a latest version of the page.

10. The computer-implemented method of claim 1, wherein in response to the validation state being invalid, the reporting is to a device of a distributed database requesting read access to the page.

11. The computer-implemented method of claim 1, wherein the computing device includes software provided as a service in a cloud environment.

12. A computer program product to establish page consensus of a database comprising one or more computer readable storage media having program instructions collectively stored on the one or more computer readable storage media, the program instructions executable to:
 receive, by a remote direct memory access (RDMA) switch operatively coupled to a computing device, a request to access a page of a database;
 determine, by the RDMA switch, based on a bitmap, a validation state of the page;
 determine, by the RDMA switch, a status of the page;
 record the request, by the RDMA switch, based on the access type and the validation state of the page; and
 report, by the RDMA switch, the validation state,
 wherein the status of the page comprises a lock status which provides a tracking of whether at least one member changes the page in the database, and
 the lock status comprises at least three dataset statuses which include a class and a state description for the page.

13. The computer program product of claim 12, wherein the updating includes upgrading or downgrading the status of the page.

14. The computer program product of claim 13, wherein the request to access the page is a write request and the status of the page is downgraded.

15. The computer program product of claim 13, wherein the request to access the page is a read request and the status of the page is upgraded.

16. A system comprising:
 a processor, a computer readable memory, one or more computer readable storage media, and program instructions collectively stored on the one or more computer readable storage media, the program instructions executable to:
 receive, by a remote direct memory access (RDMA) switch of the system, a request to access a dataset;
 determine, by the RDMA switch, a validation state of the dataset;
 determine, by the RDMA switch, a status of the dataset;
 update, by the RDMA switch, the status of the dataset based on the validation state and the request;
 identify, by the RDMA switch, a device of a distributed database that requested read access to the dataset; and
 report, by the RDMA switch, the validation state to the identified device,
 wherein the status of the dataset comprises a lock status which provides a tracking of whether at least one member changes the dataset in the distributed database, and
 the lock status comprises at least three dataset statuses which include a class and a state description for the dataset.

17. The system of claim 16, wherein the request to access the dataset is a read request and the status of the dataset is upgraded.

18. The system of claim 16, wherein the request to access the dataset is a write request and the status of the dataset is downgraded.

19. The computer-implemented method of claim 1, wherein the at least three dataset statuses comprise a first status which corresponds with a first state description of sharing with another writer, a second status which corresponds with a second state description of exclusive with another writer, and a third status which corresponds with a third state description of sharing without another writer.

20. The computer-implemented method of claim 19, wherein the at least three dataset statuses further comprise a fourth status which corresponds with a fourth state description of exclusive writer with other readers, a fifth status which corresponds with a fifth state description of intermediate status for protection, and a sixth status with corresponds with a sixth status description of exclusive without reader and writer.

* * * * *